US012500780B2

(12) United States Patent
Khan et al.

(10) Patent No.: US 12,500,780 B2
(45) Date of Patent: Dec. 16, 2025

(54) SYSTEMS AND METHODS FOR CROSS-CHAIN CHAINCODE ACCESS AND INTEROPERABILITY

(71) Applicant: Verizon Patent and Licensing Inc., Basking Ridge, NJ (US)

(72) Inventors: Ahmed A. Khan, Plano, TX (US); Rangesh Sripathi, Chennai (IN); Ravi G. Thota, Hyderabad (IN); Mohammed Alsadi, Redmond, WA (US); Jeaha Yang, Darien, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 147 days.

(21) Appl. No.: 18/485,530

(22) Filed: Oct. 12, 2023

(65) Prior Publication Data
US 2025/0125980 A1    Apr. 17, 2025

(51) Int. Cl.
H04L 9/32    (2006.01)
H04L 9/00    (2022.01)

(52) U.S. Cl.
CPC .............. *H04L 9/50* (2022.05); *H04L 9/3239* (2013.01)

(58) Field of Classification Search
CPC ....... H04L 9/50; H04L 9/3247; H04L 9/3239; G06F 21/64
See application file for complete search history.

(56) References Cited

U.S. PATENT DOCUMENTS

| | | | |
|---|---|---|---|
| 10,313,397 B2 * | 6/2019 | Komu | H04L 63/20 |
| 10,411,897 B2 * | 9/2019 | Paolini-Subramanya | H04L 63/123 |
| 10,824,759 B1 * | 11/2020 | Magerkurth | H04L 9/0894 |
| 10,929,113 B2 * | 2/2021 | Nakamura | G06F 8/40 |
| 11,030,331 B2 * | 6/2021 | Schvey | H04L 63/04 |
| 11,151,236 B2 * | 10/2021 | Nandakumar | G06F 21/645 |
| 11,277,260 B2 * | 3/2022 | Sen | H04L 9/0643 |
| 11,323,269 B2 * | 5/2022 | Cao | H04L 9/30 |
| 11,362,805 B2 * | 6/2022 | Androulaki | H04L 9/0861 |
| 11,474,854 B2 * | 10/2022 | Nakamura | G06F 16/1805 |
| 11,886,421 B2 * | 1/2024 | Padmanabhan | G06F 8/61 |
| 11,895,223 B2 * | 2/2024 | Madl | H04L 9/0637 |
| 12,058,024 B1 * | 8/2024 | Obstfeld | H04L 45/44 |
| 2016/0260095 A1 * | 9/2016 | Ford | H04L 9/3242 |
| 2017/0250815 A1 * | 8/2017 | Cuende | G06Q 20/401 |
| 2018/0091583 A1 * | 3/2018 | Collins | H04L 41/5003 |
| 2018/0103042 A1 * | 4/2018 | Castagna | H04L 63/0428 |
| 2018/0227275 A1 * | 8/2018 | Russinovich | H04L 63/08 |
| 2018/0309567 A1 * | 10/2018 | Wooden | H04L 63/12 |
| 2018/0352033 A1 * | 12/2018 | Pacella | H04L 9/3239 |
| 2019/0036698 A1 * | 1/2019 | Anglin | H04L 9/3236 |

(Continued)

Primary Examiner — David Garcia Cervetti

(57) ABSTRACT

A system described herein may identify a chaincode record recorded to a blockchain, and may output chaincode discovery information to a chaincode discovery system. A client device may receive the chaincode discovery information from the chaincode discovery system, and may output a request to invoke the chaincode. The system may obtain verification, from the chaincode discovery system, that the client device is authorized to invoke the chaincode, and may instruct a node that maintains the blockchain to execute the chaincode. The system may receive output values resulting from executing the chaincode and may output, to the client device, the output values resulting from executing the chaincode.

20 Claims, 14 Drawing Sheets

(56) References Cited

U.S. PATENT DOCUMENTS

| | | | |
|---|---|---|---|
| 2019/0149321 A1* | 5/2019 | Androulaki | H04L 9/0643 380/28 |
| 2019/0163912 A1* | 5/2019 | Kumar | H04L 9/0825 |
| 2019/0197532 A1* | 6/2019 | Jayachandran | G06Q 20/401 |
| 2019/0253257 A1* | 8/2019 | Yan | G06F 16/235 |
| 2019/0305932 A1* | 10/2019 | Townsend | H04L 9/0637 |
| 2019/0340266 A1* | 11/2019 | Vo | G06F 16/2365 |
| 2019/0340267 A1* | 11/2019 | Vo | G06F 16/2365 |
| 2019/0342084 A1* | 11/2019 | Mehedy | H04L 9/0643 |
| 2020/0034453 A1* | 1/2020 | Sato | G06F 16/18 |
| 2020/0053169 A1* | 2/2020 | Mani | H04L 61/4541 |
| 2020/0076827 A1* | 3/2020 | Gluck | H04L 9/50 |
| 2020/0082391 A1* | 3/2020 | Androulaki | G06Q 20/382 |
| 2020/0145229 A1* | 5/2020 | Li | H04L 9/3247 |
| 2020/0153606 A1* | 5/2020 | Li | H04L 9/3239 |
| 2020/0250747 A1* | 8/2020 | Padmanabhan | G06Q 20/065 |
| 2020/0252202 A1* | 8/2020 | Madl | H04L 63/12 |
| 2020/0320043 A1* | 10/2020 | Sen | G06F 16/1805 |
| 2020/0322128 A1* | 10/2020 | Hu | G06F 9/54 |
| 2020/0322308 A1* | 10/2020 | Kempf | H04L 9/3236 |
| 2020/0327100 A1* | 10/2020 | Androulaki | H04L 9/0643 |
| 2020/0349261 A1* | 11/2020 | Koorella | G06F 21/6209 |
| 2020/0379977 A1* | 12/2020 | Saket | H04L 9/3218 |
| 2020/0403799 A1* | 12/2020 | De La Rocha Gómez-Arevalillo | H04L 9/3218 |
| 2021/0021642 A1* | 1/2021 | Olson | G06F 16/275 |
| 2021/0083844 A1* | 3/2021 | Knuhtsen | H04L 9/0643 |
| 2021/0083845 A1* | 3/2021 | Sen | H04L 9/0643 |
| 2021/0117408 A1* | 4/2021 | Figueredo De Santana | G06F 16/9024 |
| 2021/0226774 A1* | 7/2021 | Padmanabhan | H04L 9/0643 |
| 2021/0226800 A1* | 7/2021 | Cao | H04L 9/0637 |
| 2021/0234674 A1* | 7/2021 | Soroker | H04L 9/3213 |
| 2021/0234694 A1* | 7/2021 | Soroker | H04L 9/0861 |
| 2021/0234695 A1* | 7/2021 | Soroker | H04L 9/3213 |
| 2021/0240673 A1* | 8/2021 | Novotny | G06F 16/1837 |
| 2021/0250168 A1* | 8/2021 | Zhang | H04L 9/3263 |
| 2021/0279741 A1* | 9/2021 | Buradagunta | G06Q 20/3823 |
| 2021/0281578 A1* | 9/2021 | Olson | H04L 63/20 |
| 2021/0314155 A1* | 10/2021 | Novotny | G06F 16/27 |
| 2022/0147999 A1* | 5/2022 | Luo | G06Q 20/065 |
| 2022/0150073 A1* | 5/2022 | Androulaki | G16H 10/60 |
| 2022/0156725 A1* | 5/2022 | Iwama | G06Q 20/3676 |
| 2022/0191047 A1* | 6/2022 | Irazabal | H04L 9/3239 |
| 2022/0209962 A1* | 6/2022 | Tarnow | H04L 9/3236 |
| 2022/0247814 A1* | 8/2022 | Parvataneni | H04L 9/3265 |
| 2022/0272085 A1* | 8/2022 | Novotny | H04L 63/126 |
| 2022/0335036 A1* | 10/2022 | Bartolucci | H04L 9/3073 |
| 2023/0036439 A1* | 2/2023 | Olson | H04L 9/3236 |
| 2023/0195722 A1* | 6/2023 | Bekiyants | G06F 16/9024 707/703 |
| 2023/0208640 A1* | 6/2023 | El Khiyaoui | H04L 9/3247 713/168 |
| 2023/0208648 A1* | 6/2023 | De Caro | H04L 9/0869 380/46 |
| 2023/0262113 A1* | 8/2023 | Li | H04L 67/1097 709/226 |
| 2023/0350874 A1* | 11/2023 | Arneault | G06F 16/215 |
| 2023/0412403 A1* | 12/2023 | Yu | H04L 9/0825 |
| 2024/0039731 A1* | 2/2024 | Kanovitz | H04L 9/50 |
| 2024/0061941 A1* | 2/2024 | Spalka | H04L 9/0822 |
| 2024/0080191 A1* | 3/2024 | Vinayagamurthy | H04L 12/1813 |
| 2024/0129143 A1* | 4/2024 | Zhu | H04L 9/3268 |
| 2024/0195809 A1* | 6/2024 | Manakame | H04L 63/0884 |
| 2024/0329965 A1* | 10/2024 | Pande | G06F 9/44526 |
| 2025/0005690 A1* | 1/2025 | Treadwell | G06N 20/00 |

* cited by examiner

| Name/description | Node group ID | Chaincode record address | Access policies | Inputs | Outputs |
|---|---|---|---|---|---|
| Chaincode_1 | 105-1 | Addr_1 | Group_A | Integer Var_A<br>String Var_B | Boolean Var_C |
| Chaincode_2 | 105-1 | Addr_2 | Group_A,<br>Group_B | String Var_D | String Var_E |
| Chaincode_3 | 105-2 | Addr_3 | Group_A,<br>Group_C | String Var_F<br>Boolean Var_G | Integer Var_H<br>String Var_I |
| Chaincode_4 | 105-3 | Addr_4 | Group_A,<br>Group_B | String Var_F<br>Boolean Var_G | Integer Var_H<br>String Var_I |

SYSTEMS AND METHODS FOR CROSS-CHAIN CHAINCODE ACCESS AND INTEROPERABILITY

BACKGROUND

Blockchains may provide for the decentralized and secure storage of data, decentralized computing, or other technical operations. Blockchains may further provide for the immutability of recorded data, as data may not be altered once recorded to a blockchain. Blockchains may be maintained by multiple nodes, such as geographically distributed or otherwise distinct servers, workstations, etc., that each maintain local copies of respective blockchains, perform computing operations based on information (e.g., executable code, instructions, variables, etc.) recorded to respective blockchains, and/or perform other operations.

BRIEF DESCRIPTION OF THE DRAWINGS

FIG. 5 illustrates example cross-chain chaincode discovery information, in accordance with some embodiments;

DETAILED DESCRIPTION OF EXAMPLE EMBODIMENTS

The following detailed description refers to the accompanying drawings. The same reference numbers in different drawings may identify the same or similar elements.

Figure 1:
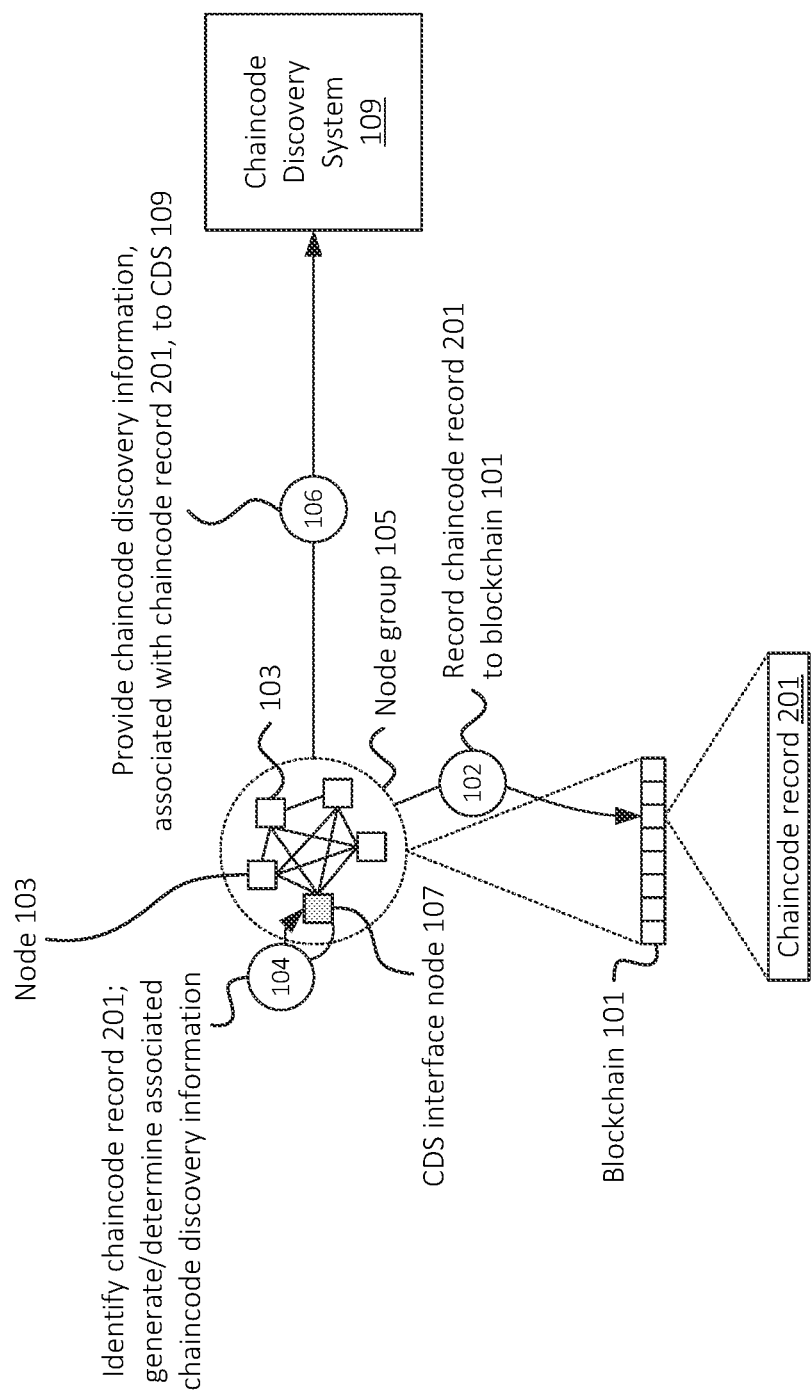
FIG. 1 illustrates an example of receiving chaincode discovery information associated with a particular blockchain, in accordance with some embodiments.

Blockchains may be maintained by multiple nodes, such as geographically distributed or otherwise distinct servers, workstations, etc., that each maintain local copies of respective blockchains. For example, as shown in FIG. 1, a particular blockchain 101 may be established and/or maintained by a set of nodes 103 (e.g., node group 105). In some embodiments, nodes 103 may be implemented in a containerized environment, in which various containers, cloud systems, and/or other virtualized environments implement one or more nodes 103.

In accordance with some embodiments, one or more nodes of node group 105 may be, may include, and/or may implement Chaincode Discovery System ("CDS") interface node 107. As discussed below, CDS interface node 107 may perform the functionality of a node 103 of node group 105 (e.g., operations with respect to maintaining, accessing, and/or modifying blockchain 101), and may further communicate with CDS 109 to perform one or more operations described herein, in accordance with some embodiments.

Such operations may include identifying chaincode or other types of information recorded to blockchain 101, providing metadata or other information to CDS 109 based on identifying the chaincode or other information recorded to blockchain 101, handling requests to execute chaincode maintained on blockchain 101, and/or other suitable operations. In this manner, a particular entity (e.g., a client device) may access blockchain 101 and/or one or more other blockchains implemented by one or more other node groups. The access to blockchain 101 may include identifying chaincode maintained on blockchain 101, without necessarily having access to other information maintained on blockchain 101. In this manner, CDS 109 may serve as a chaincode discovery mechanism, via which authorized client devices may identify particular instances of chaincode across multiple different blockchains. In this manner, such client devices may be able to perform relatively complex computations or sequences of operations, which may include invoking chaincode recorded to multiple diverse blockchains. As one example, a series of operations may include using an output of executing first chaincode, by a first node group 105 (e.g., as recorded to a respective blockchain 101 maintained by the first node group 105), to generate a first output, and then using that first output as second input to second chaincode associated with a second node group 105 (e.g., as recorded to a respective blockchain 101 maintained by the second node group 105).

Policies indicating the access and/or authorization of such client devices, to access particular blockchains 101 and/or chaincode maintained thereon, may be maintained by CDS 109 (e.g., "off-chain" with respect to respective blockchains maintained by respective node groups 105). In this manner, access authorization information may be able to be provided or updated by administrators or operators associated with CDS 109 and/or respective node groups 105, without the need to access or modify the blockchains themselves. Further, the access authorization information may, in some embodiments, be used by CDS 109 when acting as a discovery service to respective client devices, such as by indicating to such client devices which chaincode associated with which node groups 105 are available to the client devices. In this manner, the client devices do not need to individually communicate with different node groups 105 and/or administrators or operators thereof in order to identify chaincode on blockchains associated with the different node groups 105 that the client devices are authorized to invoke.

Figure 2:
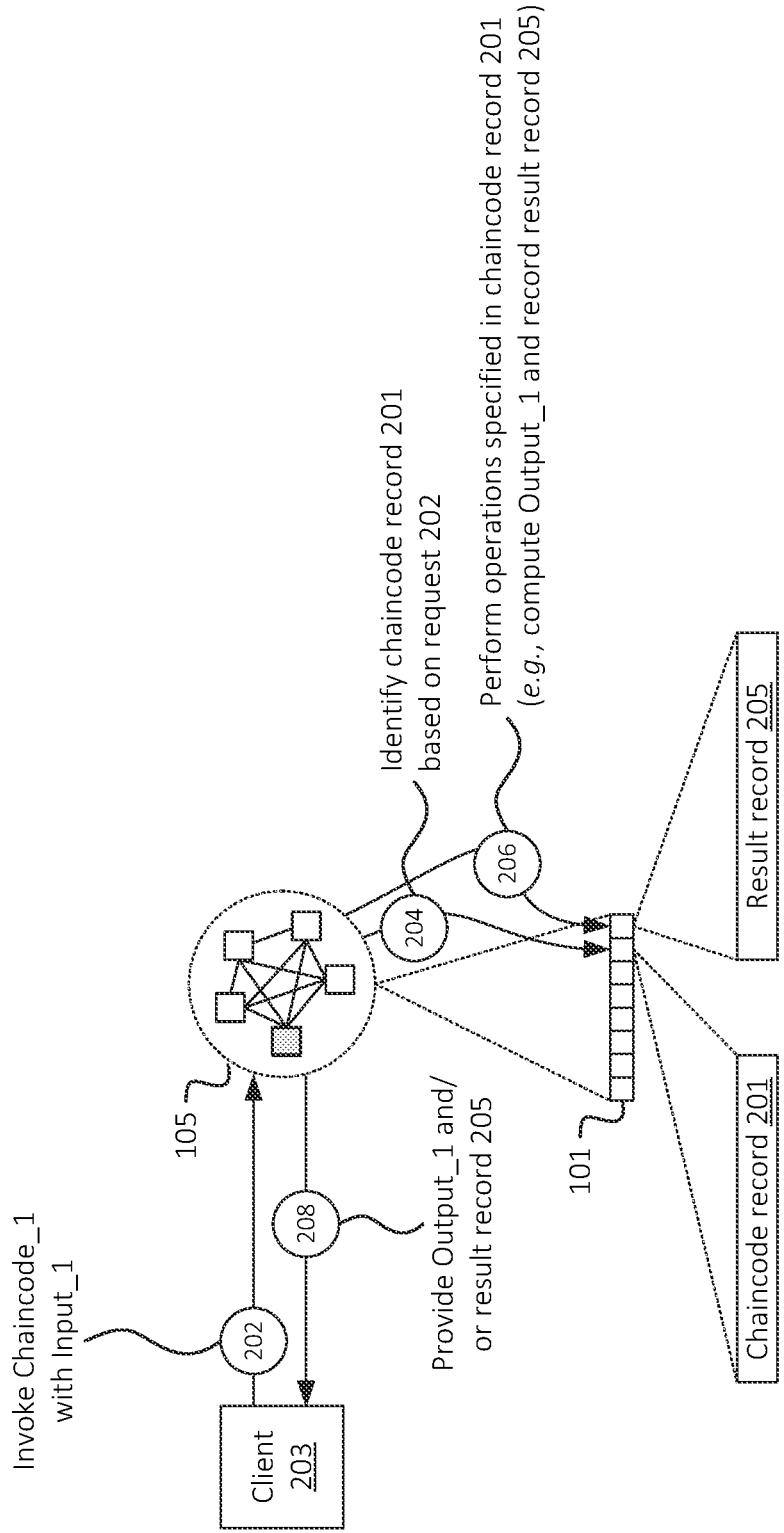
FIG. 2 illustrates an example of a client invoking particular chaincode associated with a particular blockchain, in accordance with some embodiments.

As discussed herein, chaincode may refer to instructions, commands, sub-routines, and/or other suitable information recorded to a particular blockchain 101, where such instructions, commands, etc. may be implemented, executed, etc. by one or more devices in order to perform one or more operations, computations, etc. Chaincode recorded to a particular blockchain 101 may be accessible to nodes 103 of a corresponding node group 105 or other suitable devices or systems (e.g., devices or systems that are authorized to access blockchain 101 when blockchain 101 is implemented in a permission-based or otherwise private manner). As shown in FIG. 2, for example, a particular chaincode record 201 of blockchain 101 may include such instructions, commands, etc.

At some point, node group 105 (e.g., a particular node 103 of node group 105) may receive (at 202) an instruction to invoke particular chaincode (referred to as "Chaincode_1" in this example) from client 203. The instruction may include, for example, a reference to chaincode record 201, such as an address, hash, or other identifying information based on which one or more nodes 103 of node group 105 may identify (at 204) chaincode record 201. In some embodiments, the request (at 202) to invoke the particular chaincode may include input parameters (referred to as "Input_1" in this example), which may include values to record to blockchain 101, values that are input to one or more computation operations, or the like.

One or more nodes 103 of node group 105 may perform (at 206) some or all of the operations specified in chaincode record 201, which may include computing output values (referred to as "Output_1" in this example) and/or recording result record 205 to blockchain 101. Result record 205 may include, for example, some or all of the output values and/or other information, such as a time that the request (at 202) was received, a time at which result record 205 was generated, a reference to chaincode record 201, the input values, and/or other suitable information associated with the invocation of the chaincode included in chaincode record 201. One or more nodes 103 of node group 105 may further output (at 208) a result of invoking the requested chaincode, which may include the output values, a reference to result record 205, a confirmation or acknowledgement alert, and/or other suitable information.

Returning to FIG. 1, in accordance with some embodiments, chaincode record 201 may have been recorded (at 102) to blockchain 101, such as based on a request or proposal to record chaincode record 201 by a particular node 103 of node group 105, a consensus procedure by which some or all nodes 103 may approve the recordation of chaincode record 201 to blockchain 101, and/or other suitable operations. In some embodiments, CDS interface node 107 of node group 105 may identify (at 104) the recordation of chaincode record 201 to blockchain 101, such as by "listening" to blockchain 101 to identify records that include particular information, such as chaincode or other suitable information. In some embodiments, CDS interface node 107 may receive an instruction or request from client 203 or some other suitable device or system, indicating that chaincode included in chaincode record 201 should be accessible to (e.g., invocable by) one or more other devices or systems, such as one or more other clients or devices that are external to (e.g., not part of) node group 105. In some embodiments, CDS interface node 107 may identify or generate chaincode discovery information associated with chaincode record 201, such as a name or description of the chaincode, inputs and/or outputs of the chaincode, authentication and/or authorization information of devices or systems that are authorized to invoke the chaincode, etc. For example, CDS interface node 107 may receive the chaincode discovery information from a particular client 203, which may have submitted a request to record chaincode record 201 to blockchain 101 or which may otherwise be "aware" that chaincode record 201 has been recorded to blockchain 101.

CDS interface node 107 may provide (at 106) the chaincode discovery information to CDS 109, which may maintain the chaincode discovery information. As discussed below, CDS 109 may further use the chaincode discovery information to notify devices or systems (e.g., particular authorized client devices, groups of client devices, etc.) that the chaincode record 201 is accessible to such devices or systems, provide authentication and/or authorization functions for node group 105 to assist in determining whether a given client is authorized to invoke the chaincode, and/or to perform other suitable operations.

Figure 3:
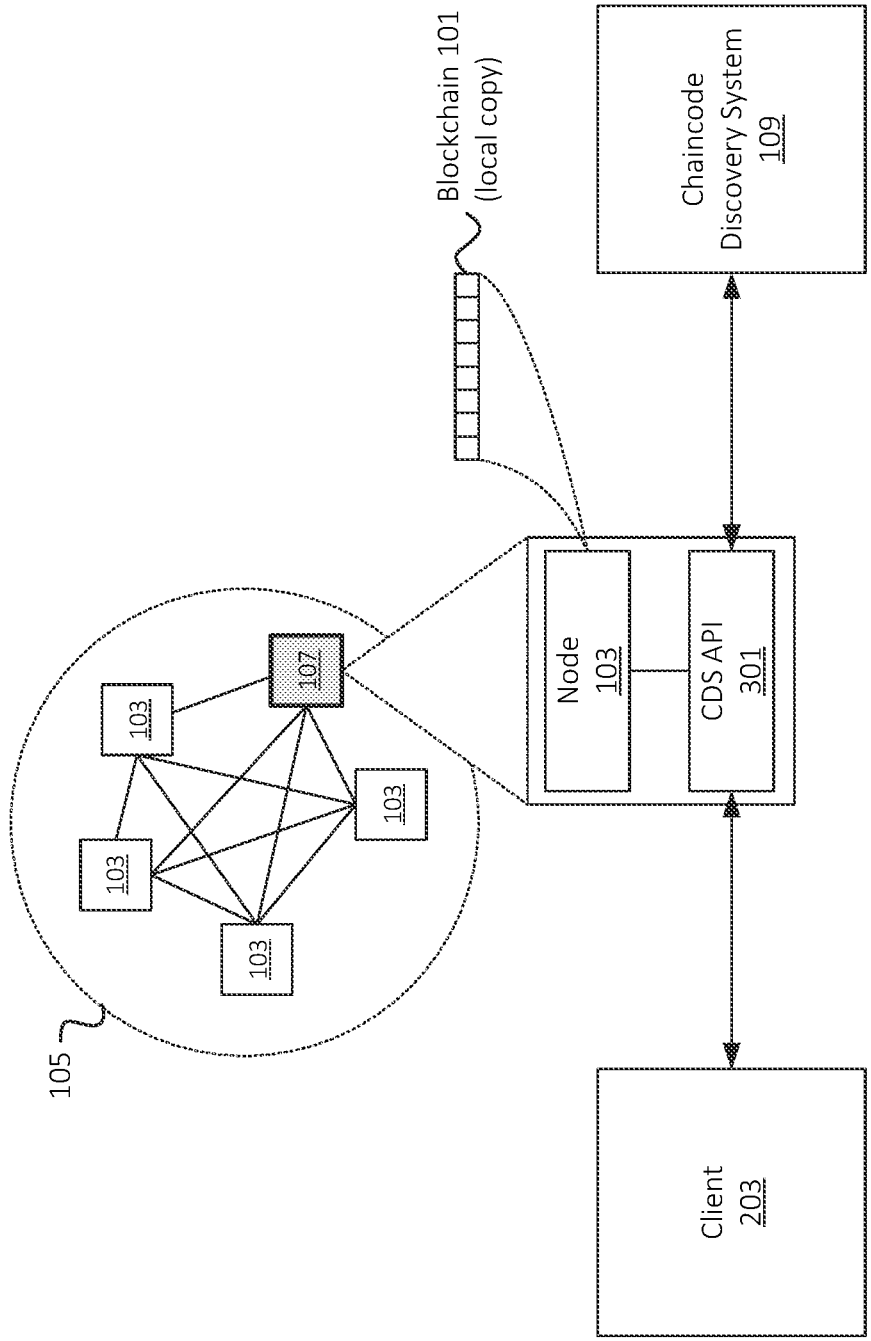
FIG. 3 illustrates example communication interfaces between one or more devices or systems, in accordance with some embodiments.

As discussed above, as shown in FIG. 3, CDS interface node 107 may communicate with CDS 109 and/or one or more clients 203 in order to facilitate the discovery of chaincode maintained on blockchain 101 with which CDS interface node 107 is associated. For example, as shown, node group 105 may include a set of nodes 103 as well as one or more CDS interface nodes 107. In the examples provided herein, each node group 105 has one single CDS interface node 107. In practice, a given node group 105 may include multiple CDS interface nodes 107 (e.g., multiple instances of CDS interface node 107). Further, while the functionality of CDS interface node 107 is shown as including the functionality of a particular node 103 as well as CDS application programming interface ("API") 301, a particular device or system may perform the functionality of CDS API 301 without performing the functionality of a given node 103. In such instances, CDS API 301 may be implemented by some other device or system that is communicatively coupled to one or more nodes 103 of node group 105.

CDS API 301 may communicate with node 103 to identify information recorded to blockchain 101 as maintained by node group 105. For example, node 103 may maintain a local copy of blockchain 101, and may provide access to CDS API 301, such that CDS API 301 is able to request information recorded to blockchain 101 and/or to request other operations be performed with respect to blockchain 101 and/or node group 105 (e.g., invoke chaincode maintained on blockchain 101). In some embodiments, node 103 may maintain or otherwise implement access permissions with respect to CDS API 301. For example, node 103 may maintain information indicating that CDS API 301 is only authorized to access chaincode recorded to blockchain 101, that CDS API 301 is only authorized to access records of blockchain 101 that include a particular set of tags or keywords, etc. In this manner, CDS API 301 may have selective access to information recorded to blockchain 101, without having full access to blockchain 101.

CDS API 301 may also communicate with CDS 109, such as to provide chaincode discovery information, to authorize particular clients 203 requesting the invocation of chaincode recorded to blockchain 101, and/or other operations discussed herein. Additionally, CDS API 301 may communicate with one or more clients 203 or other devices, such as to receive requests to invoke chaincode recorded to blockchain 101, provide results of executing such chaincode, and/or other operations discussed herein.

Figure 4:
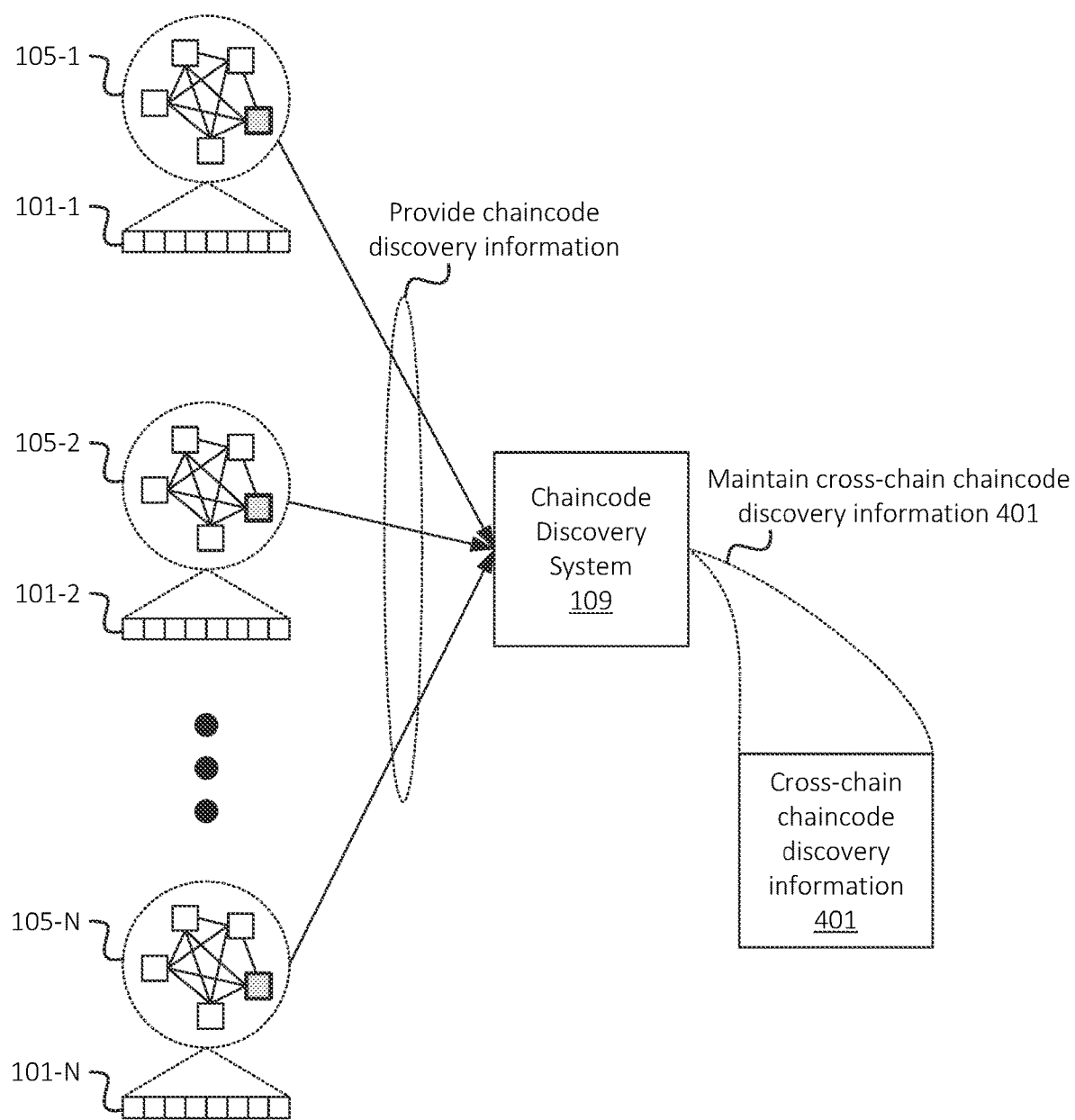
FIG. 4 illustrates an example of maintaining cross-chain chaincode discovery information, in accordance with some embodiments.

In this manner, as shown in FIG. 4, CDS 109 may be able to receive chaincode discovery information from multiple node groups 105 (e.g., multiple CDS interface nodes 107 that are each respectively associated with such node groups 105), such as node group 105-1, node group 105-2, node group 105-N, etc., which respectively maintain blockchains 101-1, 101-2, and 101-N. The chaincode discovery information received from the multiple node groups 105 may be referred to as cross-chain chaincode discovery information 401.

FIG. 5, provides an example of cross-chain chaincode discovery information 401, as provided by respective CDS interface nodes 107 associated with example node groups 105-1, 105-2, and 105-3. Cross-chain chaincode discovery information 401 is represented in FIG. 5 as a table with rows and columns. In practice, cross-chain chaincode discovery information 401 may be maintained or represented as some other type of data structure or otherwise in some other suitable form. Cross-chain chaincode discovery information 401 may include, for each particular chaincode, a name and/or description, an identifier of a particular node group 105 with which the chaincode is associated, a chaincode record address, access polices, inputs, outputs, and/or other suitable information. As discussed above, the information included in cross-chain chaincode discovery information 401 for a particular chaincode may have been generated or provided by a respective CDS interface node 107 associated with the particular node group 105 that maintains the particular chaincode.

The name or description, for a given chaincode, may include an indication of the operations performed by the chaincode, a "friendly" (e.g., user-readable) description of the functionality of the chaincode, comments or annotations associated with the chaincode, and/or other information regarding the chaincode. The node group identifier for a given chaincode may include an identifier of node group 105, an Internet Protocol ("IP") address or other communication information of one or more nodes 103 of node group 105, an IP address or other communication information of one or more CDS interface nodes 107 of node group 105, a channel name associated with node group 105, and/or other suitable information based on which node group 105 may be communicated with. The chaincode record address for a given chaincode may include a hash, address, or other identifier based on which a given chaincode record, associated with blockchain 101 maintained by node group 105, may be identified. The access policies may specify particular devices, clients 203, groups (e.g., device groups, client groups, user groups, categories, etc.), or other policies indicating entities that are authorized to access (e.g., view or invoke) particular chaincode. The inputs and/or outputs for a particular chaincode may specify types and/or quantities of input information used by the particular chaincode to generate outputs, and may further specify types and/or quantities of such outputs. In this manner, cross-chain chaincode discovery information 401 may include references to, or other information associated with, chaincode maintained on different blockchains 101, without maintaining or exposing the chaincode itself.

Figure 6:
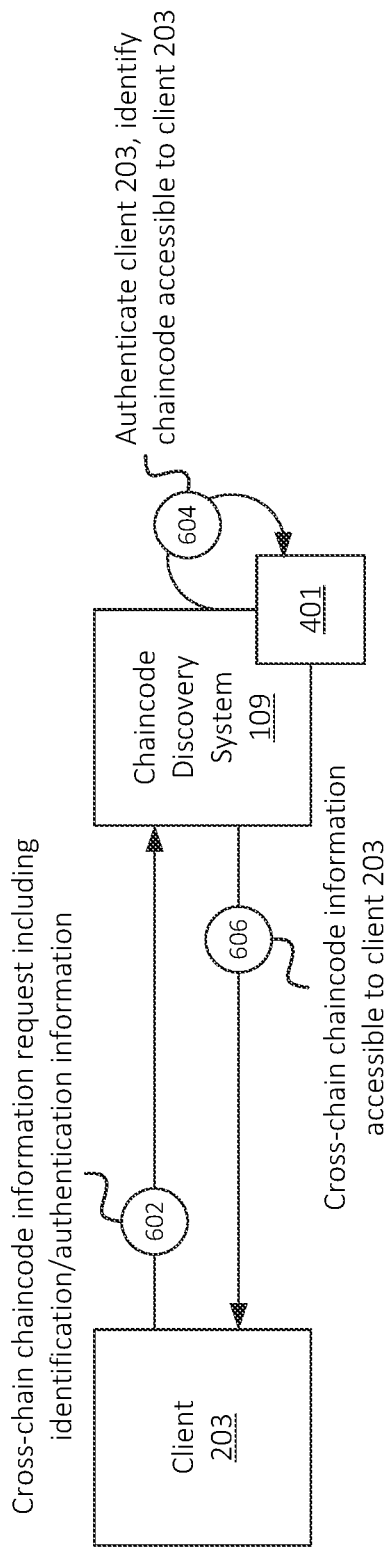
FIG. 6 illustrates an example of providing a cross-chain chaincode discovery service, in accordance with some embodiments.

As shown in FIG. 6, CDS 109 may provide a discovery service to one or more clients 203, such as clients 203 that are authorized (e.g., as indicated in the access policies) to access or invoke chaincode indicated in cross-chain chaincode discovery information 401. For example, as shown, a particular client 203 may request (at 602) cross-chain information, which may be provided in order to determine particular chaincode associated with one or more node groups 105 that client 203 is authorized to access, invoke, etc. Client 203 may, for example, make such requests on a periodic basis, an intermittent basis, or on some other suitable basis.

CDS 109 may identify (at 604) cross-chain chaincode that is pertinent to client 203, such as chaincode that is indicated in the access policies of cross-chain chaincode discovery information 401 as being chaincode that client 203 is authorized to access, invoke, etc. For example, the request (at 602) may include identification and/or authentication information of client 203, such as an IP address, an authentication token, a password, and/or other suitable identification and/or authorization information. In some embodiments, CDS 109 may automatically identify (at 604) cross-chain chaincode that is pertinent to client 203 (e.g., without a request at 602), such as in instances where updated chaincode information is received by CDS 109 and CDS 109 identifies that such chaincode information is pertinent to client 203. In other words, CDS 109 may, in some embodiments, "push" (at 606) cross-chain chaincode information to client 203. Additionally, in some embodiments, CDS 109 may respond (at 606) to authorized requests (at 602) from client 203 with cross-chain chaincode information that is pertinent to client 203.

Figure 7:
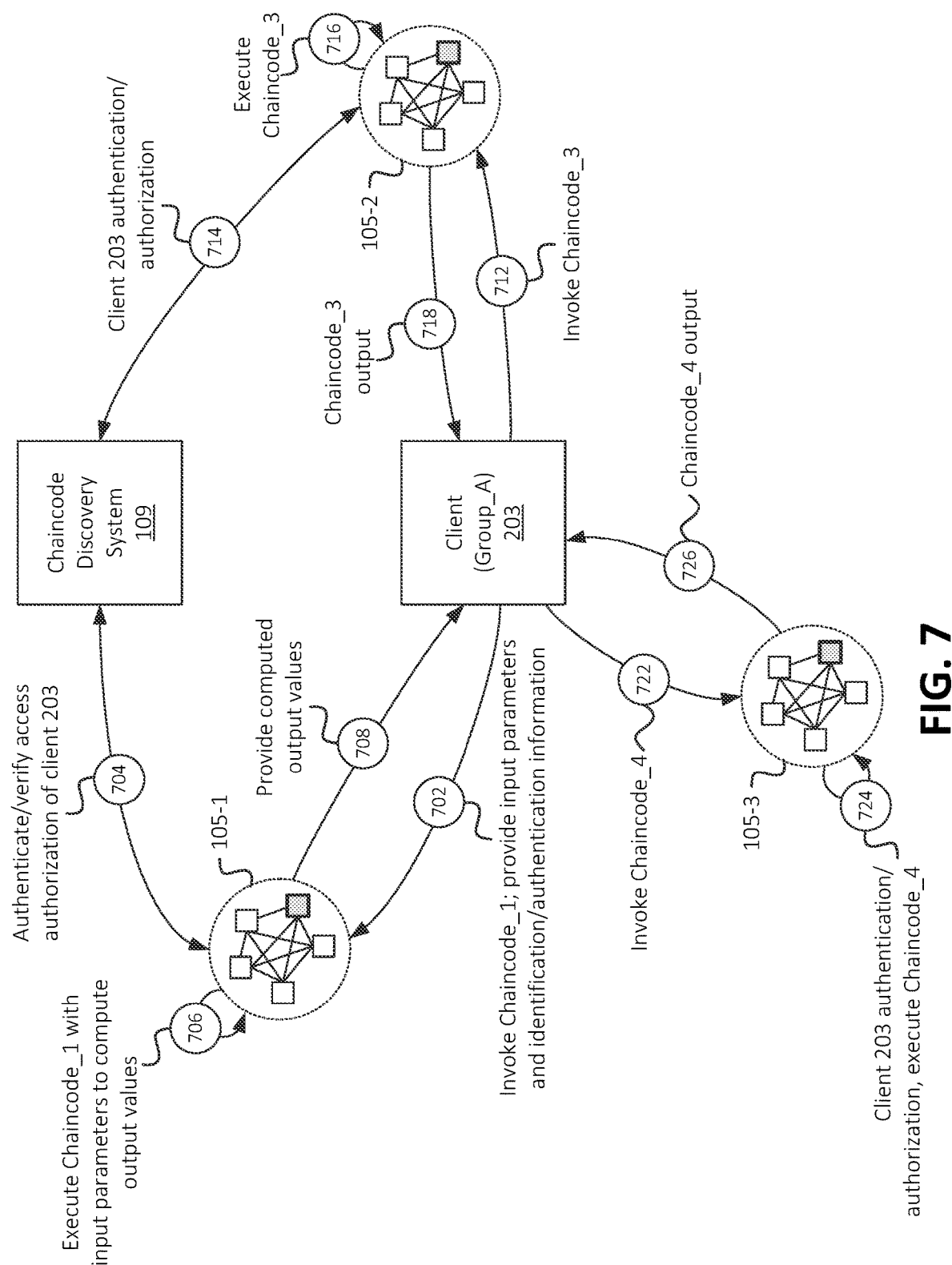
FIGS. 7 and 8 illustrate an example of a client invoking chaincode on multiple blockchains, in accordance with some embodiments.

Client 203 may perform similar operations in order to receive or maintain information associated with multiple blockchains 101 (e.g., as maintained by multiple node groups 105), indicating chaincode recorded to the multiple blockchains 101 that client 203 is authorized to access, invoke, etc. Client 203 may accordingly use the cross-chain chaincode information to invoke chaincode associated with multiple blockchains 101. For example, as shown in FIG. 7, assume that client 203 is associated with an example authorization group "Group_A." Referring to the example access policies shown in FIG. 5, client 203 may accordingly be authorized to access, invoke, etc. chaincode recorded to blockchains 101-1, 101-2, and 101-3 (e.g., as maintained by node groups 105-1, 105-2, and 105-3, respectively). For example, client 203 may be authorized to access, invoke, etc. Chaincode_1 and Chaincode_2 maintained by node group 105-1, Chaincode_3 maintained by node group 105-2, and Chaincode_4 maintained by node group 105-3.

Node group 105-1 may, in this example, invoke (at 702) Chaincode_1 by communicating with one or more nodes 103 of node group 105-1, and/or with CDS interface node 107 of node group 105-1. For example, client 203 may provide a set of inputs, an address or reference to a particular chaincode record 201 that is associated with Chaincode_1 (as maintained in blockchain 101-1), and/or some other indication that Chaincode_1 should be invoked. In some embodiments, client 203 may also provide identification and/or authentication information indicating an identity and/or authentication credentials of client 203. In some embodiments, the request may include a flag or other indicator that the request (at 702) is associated with an access policy maintained by CDS 109. In some embodiments, in situations where a particular node 103 of node group 105-1 (e.g., other than CDS interface node 107) receives the request, such node 103 may forward the request to a particular CDS interface node 107 associated with node group 105-1 (e.g., based on identifying the flag, indicator, etc. included in the request).

Node group 105-1 (e.g., CDS interface node 107 of node group 105-1) may communicate (at 704) with CDS 109 to authenticate and/or verify access authorization of client 203. For example, CDS interface node 107 may provide an identifier of client 203 and/or other identifying attributes of client 203 to CDS 109, which CDS 109 may use to determine whether client 203 is authorized to invoke the particular chaincode indicated in the request (at 702). In some embodiments, CDS 109 may provide authentication functions, such as verifying an authentication token or other suitable authentication information of client 203. In some embodiments, CDS 109 may communicate directly with client 203 to authenticate client 203, and/or node group 105-1 may forward authentication information, included in the request (at 702), to CDS 109. In this example, assume that CDS 109 indicates (at 704) to node group 105-1 that client 203 is authenticated and is authorized to invoke Chaincode_1.

Node group 105-1 may accordingly execute (at 706) Chaincode_1, which may include using input parameters provided (at 702) by client 203 when executing Chaincode_1. In some embodiments, executing Chaincode_1 may include CDS interface node 107 submitting a request to one or more other nodes 103 to execute Chaincode_1. That is, CDS interface node 107 may have initially received (at 702) the request, and other nodes 103 of node group 105-1 may not have been instructed at that time to execute Chaincode_1. Once CDS interface node 107 has determined (e.g., based on communicating (at 704) with CDS 109) that client 203 is authenticated and is authorized to issue such request, CDS interface node 107 may proceed to instruct, request, etc. the execution of Chaincode_1 by one or more other nodes 103 of node group 105-1. As discussed above, executing Chaincode_1 may include generating one or more records to add to blockchain 101 of node group 105-1, computing output values, or other suitable operations. Node group 105-1 may provide (at 708) the output values resulting from the execution of Chaincode_1. As discussed above, such output values may include values computed based on the execution of Chaincode_1, a reference to a particular result record 205 generated on blockchain 101 based on the execution of Chaincode_1, etc.

As further shown, client 203 may proceed to invoke chaincode associated with other node groups 105, such as node groups 105-2 and 105-3. For example, as discussed above, client 203 may have received (at 606) cross-chain chaincode information indicating that Chaincode_3, maintained by node group 105-2, as well as Chaincode_4, maintained by node group 105-3, are accessible to and/or invocable by client 203. As such, client 203 may communicate (at 712) with node group 105-2 (e.g., with a particular node 103 and/or CDS interface node 107 of node group 105-2) to invoke Chaincode_3, node group 105-2 may communicate (at 714) with CDS 109 to verify authentication and/or authorization of client 203, may execute (at 716) Chaincode_3, and may provide (at 718) output values associated with the execution of Chaincode_3.

Additionally, client 203 may communicate (at 722) with node group 105-3 to invoke Chaincode_4. In accordance with some embodiments, node group 105-3 may authenticate and/or verify authorization of client 203 without communicating with CDS 109. For example, CDS interface node 107 of node group 105-3 may act as an authentication and/or authorization platform, such as by maintaining authentication and/or authorization information, and/or performing authentication functions, such that CDS interface node 107 does not need to contact CDS 109 to verify authentication and/or authorization of client 203. In some embodiments, authentication and/or authorization of client 203 may be performed in a tiered or hierarchical manner, in which CDS interface node 107 first attempts to authenticate and/or verify authorization of client 203, and then communicates with CDS 109 to assist with the authentication and/or authorization verification if CDS interface node 107 is unable to authenticate and/or verify authorization of client 203. In some embodiments, on the other hand, in some embodiments, CDS 109 may first attempt to authenticate and/or verify authorization of client 203, and then may communicates with CDS interface node 107 to assist with the authentication and/or authorization verification if CDS 109 is unable to authenticate and/or verify authorization of client 203.

Assuming that node group 105-3 authenticates and/or verifies authorization of client 203, node group 105-3 may proceed to execute (at 724) Chaincode_4 and may provide (at 726) output values, resulting from the execution of Chaincode_4, to client 203. In this manner, client 203 may be able to access chaincode maintained by diverse node groups 105 which may not necessarily have any relationship or "awareness" of each other. Client 203 may be able to perform intricate sequences of operations by way of invoking different chaincode from different node groups 105, without the need to perform such computations itself, thus conserving processing resources of client 203 while leveraging resources devoted to node groups 105.

Figure 8:
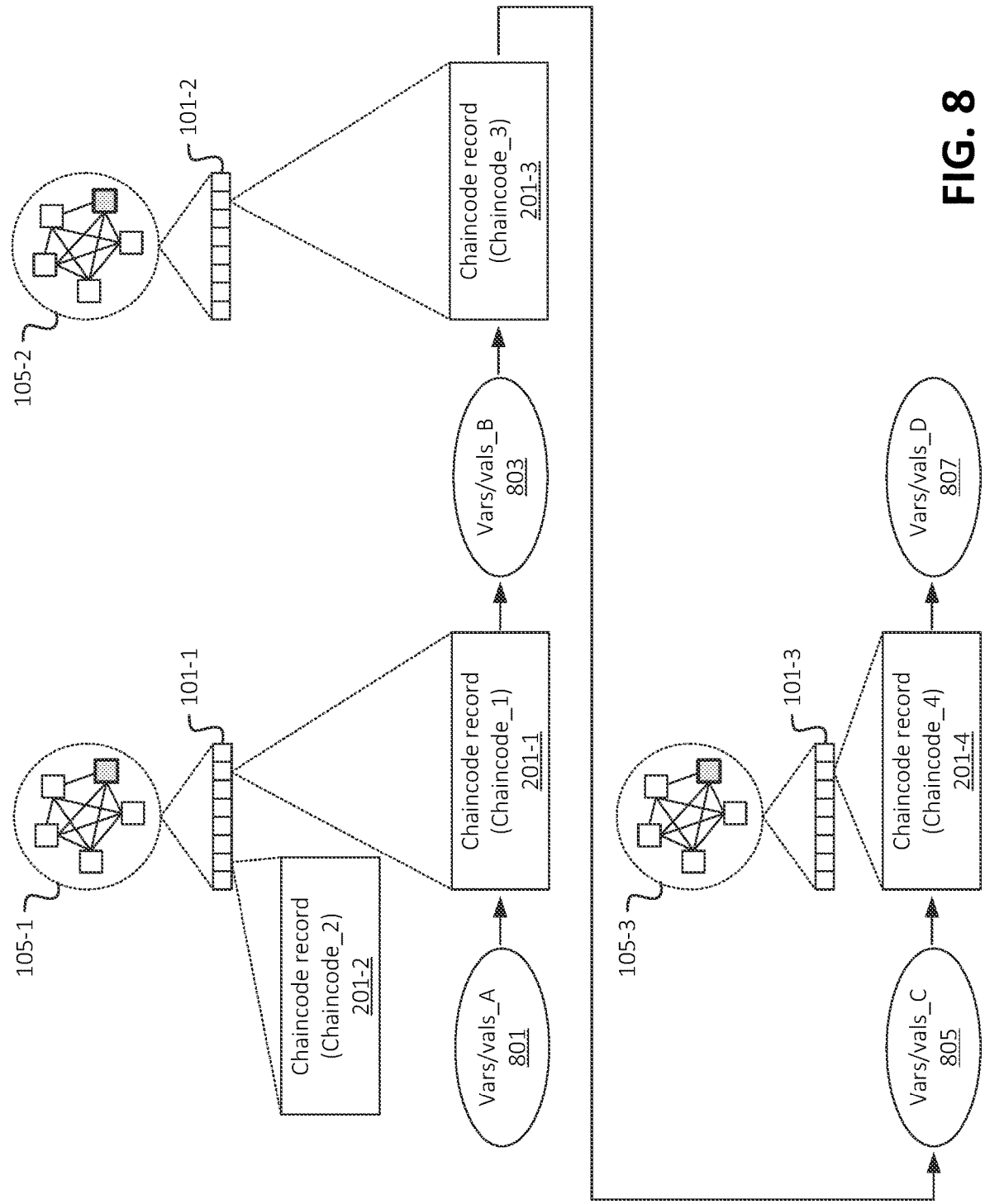

For example, as conceptually shown in FIG. 8, the operations shown in FIG. 7 may performed in a sequence, such that the output of the execution of one chaincode is used as the input of another. FIG. 8 illustrates, for instance, input parameters and output values of the various chaincode invoked in the example of FIG. 7. As shown, node group 105-1 may maintain blockchain 101-1, on which chaincode records 201-1 and 201-2 (which include Chaincode_1 and Chaincode_2, respectively) are stored. Additionally, node group 105-2 may maintain blockchain 101-2, on which chaincode record 201-3 (which includes Chaincode_3) is stored. Further, node group 105-3 may maintain blockchain 101-3, on which chaincode record 201-4 (which includes Chaincode_4) is stored.

The execution of Chaincode_1 (e.g., at 706) may be performed by a first set of variables and/or values 801 (shown in the figure as "vars/vals_A" and referred to herein simply as "values 801" for the sake of brevity). Values 801 may have been provided by client 203 (at 702) when client 203 requested the execution of Chaincode_1. The output of executing Chaincode_1 may include a second set of values 803, which may be provided (at 708) to client 203 and used as input (e.g., included in the request at 712) for Chaincode_3. Similarly, the output of executing Chaincode_3 may include a second set of values 805, which may be provide (at 718) to client 203 and used as input (e.g., included in the request at 722) for Chaincode_4. The output of executing Chaincode_4 (e.g., values 807) may be provided (e.g., at 726) to client 203. In this manner, value 807 may be the ultimate result of invoking chaincode from across different blockchains 101 that are maintained by diverse node groups 105 which are not necessarily configured to communicate with each other or to be "aware" of each other in any way.

Figure 9:
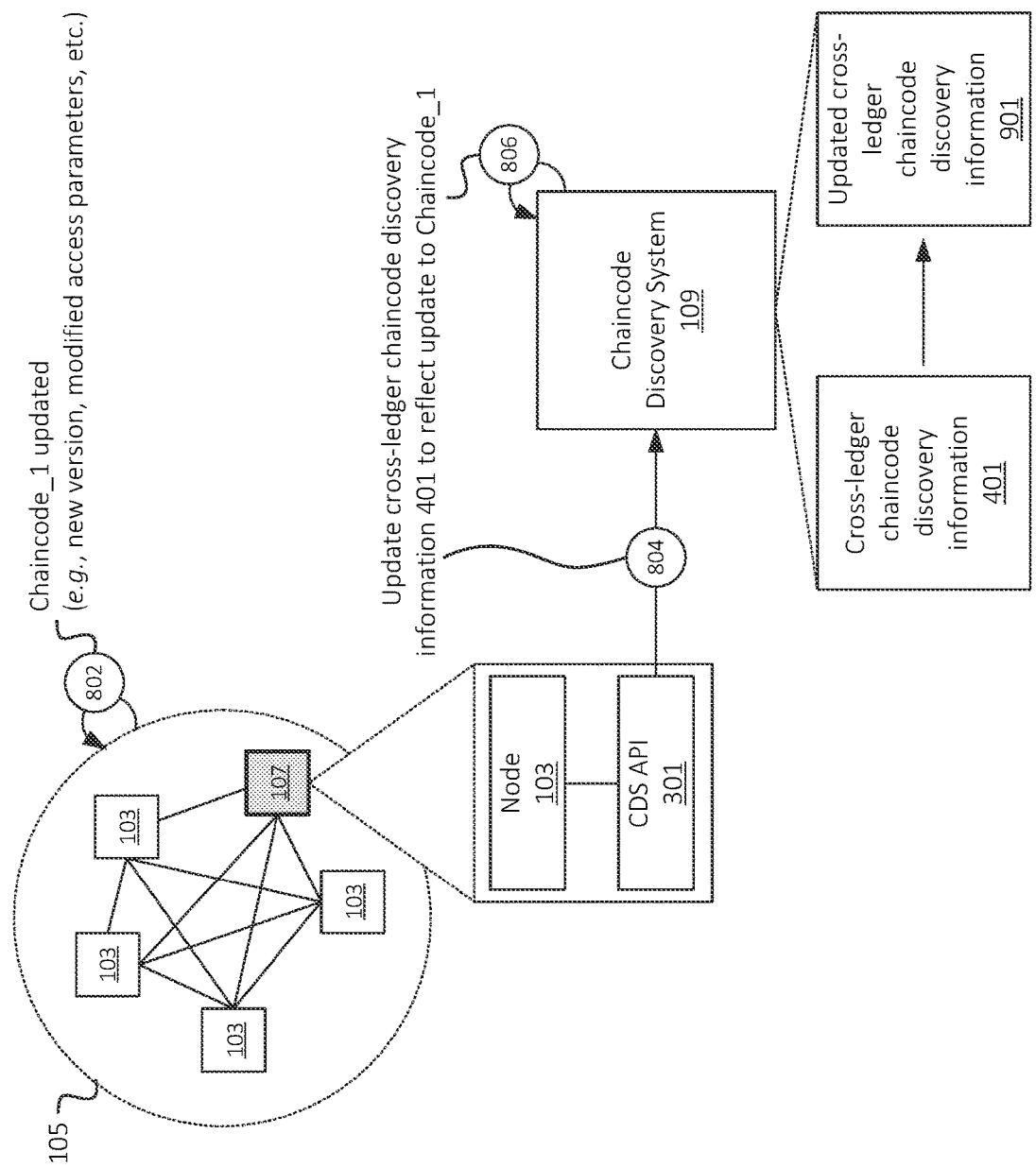
FIG. 9 illustrates an example of a dynamic updated of cross-chain chaincode discovery information, in accordance with some embodiments.

As discussed above, embodiments herein provide for dynamic updates of chaincode parameters such as access parameters, inputs and/or outputs, chaincode versions (e.g., where different versions include different sets of instructions or operations to be performed), etc. For example, as shown in FIG. 9, Chaincode_1 may be updated (at 802) on blockchain 101 of node group 105, which may include updating Chaincode_1 to a new version. For example, blockchain 101 may include a new record that includes an identifier or flag associated with Chaincode_1, where the new record includes an updated version of Chaincode_1. CDS interface node 107 may, as discussed above, "listen" to blockchain 101 or otherwise identify that Chaincode_1 has been updated, and may communicate (at 804) with CDS 109 to indicate the updated information (e.g., an updated reference to a particular record of blockchain 101 that includes the new version of Chaincode_1, updated input and/or output values, etc.). CDS 109 may accordingly update (at 806) cross-chain chaincode discovery information 401. After updating cross-chain chaincode discovery information 401, CDS 109 may maintain updated cross-chain chaincode discovery information 901, which includes the updated parameters of Chaincode_1. In some embodiments, as discussed above, CDS 109 may "push" the updated information to clients 203 that are authorized to access and/or invoke Chaincode_1, and/or such clients 203 may identify the updated information in some other suitable manner.

In some embodiments, the updated information for Chaincode_1 may be unrelated to information recorded to blockchain 101 of node group 105, and/or may not be triggered by any change to information recorded to blockchain 101 of node group 105. For example, CDS interface node 107 (e.g., CDS API 301) may receive an indication, such as from an authorized administrator or other device or system, that access policies associated with Chaincode_1 have been modified, such as by adding or removing authorized clients 203 or groups, and/or by adding or removing other access parameters or policies. In this manner, the update (at 804) may include the updates to such policies, but may not include an updated reference to blockchain 101 (e.g., since information on blockchain 101 associated with Chaincode_1 has not changed).

Figure 10A:
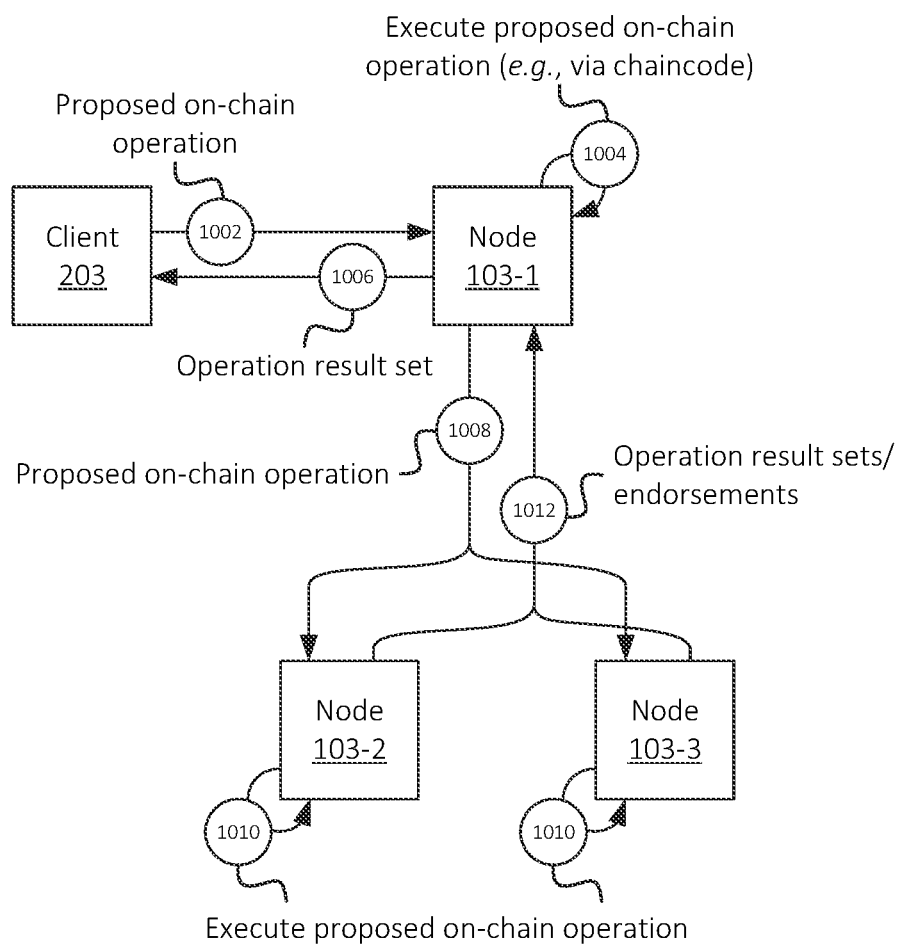
FIGS. 10A and 10B illustrate example operations associated with recording information to a blockchain, in accordance with some embodiments.
Figure 10B:
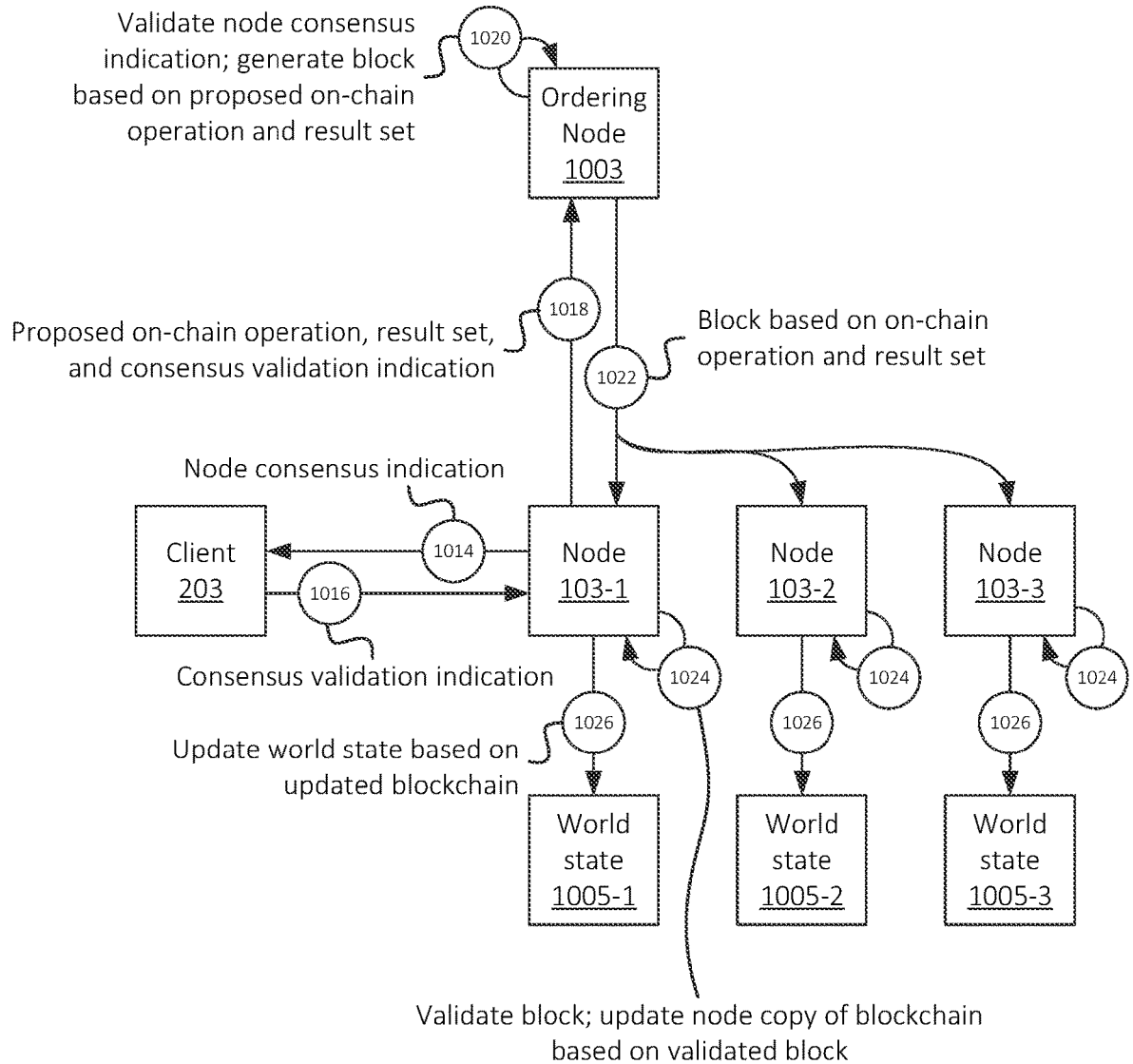

FIGS. 10A and 10B illustrate an example of modifying blockchain 101 and/or world state information based on an interaction with a particular blockchain 101 that is associated with a particular node group 105. As shown, a particular node 103-1, of node group 105, may receive (at 1002) a proposed on-chain operation (e.g., a request to access or record information to blockchain 101) from a particular source, such as client 203 (e.g., which may be or may be implemented by a device or system that has access to node 103-1, such as a device or system that has authentication credentials, locator information, etc. via which client 203 is able to interact with node 103-1). In some embodiments, node 103-1 may receive the proposed on-chain operation from a blockchain management system (e.g., which may receive the proposed on-chain operation from client 203 and may select node 103-1 out of a group of nodes 103, such as a group of nodes associated with the same channel in a channel-based blockchain system, such as the Hyperledger® Fabric), an ordering node, or other suitable device or system.

Client 203 may be, for example, an entity associated with blockchain 101 (e.g., may be associated with an address, a "wallet," a decentralized application ("dApp"), etc.). In this example, assume that client 203 is authorized to initiate, request, etc. the proposed on-chain operation, which may include the modification of one or more values of one or more attributes that are currently associated with blockchain 101, the addition of one or more attributes to blockchain 101, or other suitable interactions. In other examples, node 103-1 and/or some other device or system may verify that client 203 is authorized to initiate the proposed on-chain operation.

In some embodiments, the proposed on-chain operation (received at 1002) may indicate particular chaincode recorded to blockchain 101, which may specify one or more inputs (e.g., types of inputs, quantity of inputs, and/or other input parameters), and may also include actions to take with respect to the inputs in order to generate one or more outputs. For example, the proposed on-chain operation may specify particular chaincode (e.g., an address associated with blockchain 101 with which a record that includes the chaincode is associated) and one or more input values according to input parameters specified by the particular chaincode. In some examples, the proposed on-chain operation may refer to one or more values that have previously been recorded to blockchain 101 (and thus reflected in world state information associated with blockchain 101), such as an interaction that increments or decrements previously recorded values or performs other computations based on previously recorded values.

Node 103-1 may execute (at 1004) the proposed on-chain operation, which may include accessing the one or more values that were previously recorded to blockchain 101. In order to determine the one or more values referred to in the proposed on-chain operation, node 103-1 may access world state information, maintained by node 103-1, to determine such values. Such access may include checking a local cache and/or accessing, via a network, a remote system (e.g., a "cloud" system, a containerized system, etc.) associated with node 103-1 that maintains the world state associated with blockchain 101. The execution (at 1004) may be a "simulation" of the proposed on-chain operation, inasmuch as the execution and of the proposed on-chain operation and the ensuing result may not yet be recorded to blockchain 101. The interaction may become "final" or "committed" based on validation by one or more other nodes. The result may include a "read-write set," which may include the values of the one or more attributes that were accessed (e.g., the values based on which the interaction was performed), as well as the resulting values after execution of the proposed interaction.

Node 103-1 may provide (at 1006) the result set (e.g., the read-write set) based on executing (at 1004) the proposed interaction to client 203. Client 203 may maintain the result set to, for example, verify and/or to provide approval of the result set before the result set is committed to blockchain 101. Node 103-1 may also provide (at 1008) the proposed on-chain operation to one or more other nodes 103 associated with blockchain 101, such as nodes 103-2 and 103-3. In some embodiments, node 103-1 may provide (at 1008) the result set generated by node 103-1 to nodes 103-2 and 103-3. Nodes 103-1 through 103-3 may all be associated with the same channel, nodes 103-2 and 103-3 may be specified by the chaincode as validators, and/or nodes 103-2 and 103-3 may otherwise be identified by node 103-1 or an associated blockchain management system as nodes that should validate, endorse, etc. the execution and result of the proposed interaction.

As similarly discussed with respect to node 103-1, nodes 103-2 and 103-3 may execute (at 1010), and/or simulate the execution of, the proposed interaction. Accordingly, nodes 103-2 and 103-3 may access one or more values that were previously recorded to blockchain 101 using world state information maintained by nodes 103-2 and 103-3. Nodes 103-2 and 103-3 may validate, verify, etc. the result set generated by node 103-1 by comparing the result set with respective result sets generated by nodes 103-2 and 103-3. Nodes 103-2 and 103-3 may respond (at 1012) to node 103-1 with respective result sets generated by nodes 103-2 and 103-3, and/or may respond with an indication, endorsement, etc. (e.g., which may be respectively signed by nodes 103-2 and 103-3) that the result set generated by node 103-1 is valid. Once node 103-1 has received endorsements from at least a threshold quantity of other nodes (e.g., from nodes 103-2 and 103-3, in this example), node 103-1 may determine that a consensus has been reached with respect to the result set for the proposed interaction.

As shown in FIG. 10B, node 103-1 may accordingly provide (at 1014), to client 203, an indication that consensus for the result set (provided at 1006) has been reached. In some embodiments, client 203 may validate the consensus (e.g., by evaluating signatures of nodes 103-2 and 103-3) and/or may verify the result set (e.g., by itself executing the proposed interaction). Client 203 may provide (at 1016), to node 103-1, an indication that client 203 has validated the consensus and/or has verified the result set. In some embodiments, the consensus validation indication may be signed by client 203, thus securely authenticating the validation by client 203.

Node 103-1 may provide (at 1018) the result set, along with the consensus validation indication and the proposed on-chain operation, to ordering node 1003. Ordering node 1003 may be a node, associated with the same channel as nodes 103-1 through 103-3, that validates (at 1020) the consensus validation indication (e.g., validates signatures associated with client 203 and/or nodes 103-1 through 103-3) and generates a block, to be recorded to blockchain 101, that includes information regarding the on-chain operation. Such information may include an identifier of client 203 (e.g., an address, wallet identifier, etc.), identifiers of nodes 103-1 through 103-3 that participated in generating and/or validating the result set based on the on-chain operation, chaincode inputs provided by client 203, the consensus validation indication, one or more timestamps of the above operations and/or other events, and/or other suitable information associated with the on-chain operation. In some embodiments, the block may be signed by ordering node 1003, thus securely authenticating the block creation by ordering node 1003. At this point, the on-chain operation may no longer be a "proposed" on-chain operation, as the interaction has been finalized, committed, etc. by ordering node 1003. In some implementations, nodes 103-1 through 103-3 may be referred to as "peers," to indicate that such nodes 103-1 through 103-3 are distinct from ordering node 1003 (e.g., ordering node 1003 performs one or more different operations from the peers).

Ordering node 1003 may propagate (at 1022) the signed block, including information regarding the finalized on-chain operation initiated by client 203, to nodes 103-1 through 103-3 and/or other nodes associated with the same channel. Nodes 103-1 through 103-3 may validate (at 1024) the block, which may include verifying the signature of ordering node 1003, and may accordingly update a respective copy of blockchain 101 as maintained by each one of nodes 103-1 through 103-3. Nodes 103-1 through 103-3 may maintain respective independent copies of blockchain 101, thus providing an element of decentralization to blockchain 101. As such, when adding the block (received at 1022), nodes 103-1 through 103-3 may continue to maintain separate copies of the same blockchain 101, including the information regarding the finalized on-chain operation.

Nodes 103-1 through 103-3 may also maintain respective world state information 1005 (e.g., world state information 1005-1, 1005-2, and 1005-3). For example, world state information 1005 may include a portion of the information stored in blockchain 101, such as the latest version of some or all of the attributes for which information has been recorded to blockchain 101. Nodes 103-1 through 103-3 may accordingly update (at 1026) respective copies of world state information 1005 based on the received block. For example, in the event that the block includes a change in the value of a particular attribute, nodes 103-1 through 103-3 may update world state information 1005-1 through 1005-3, respectively, to replace a previous value of the attribute (e.g., a previous version of the attribute) with the newly received value of the particular attribute.

Figure 11:
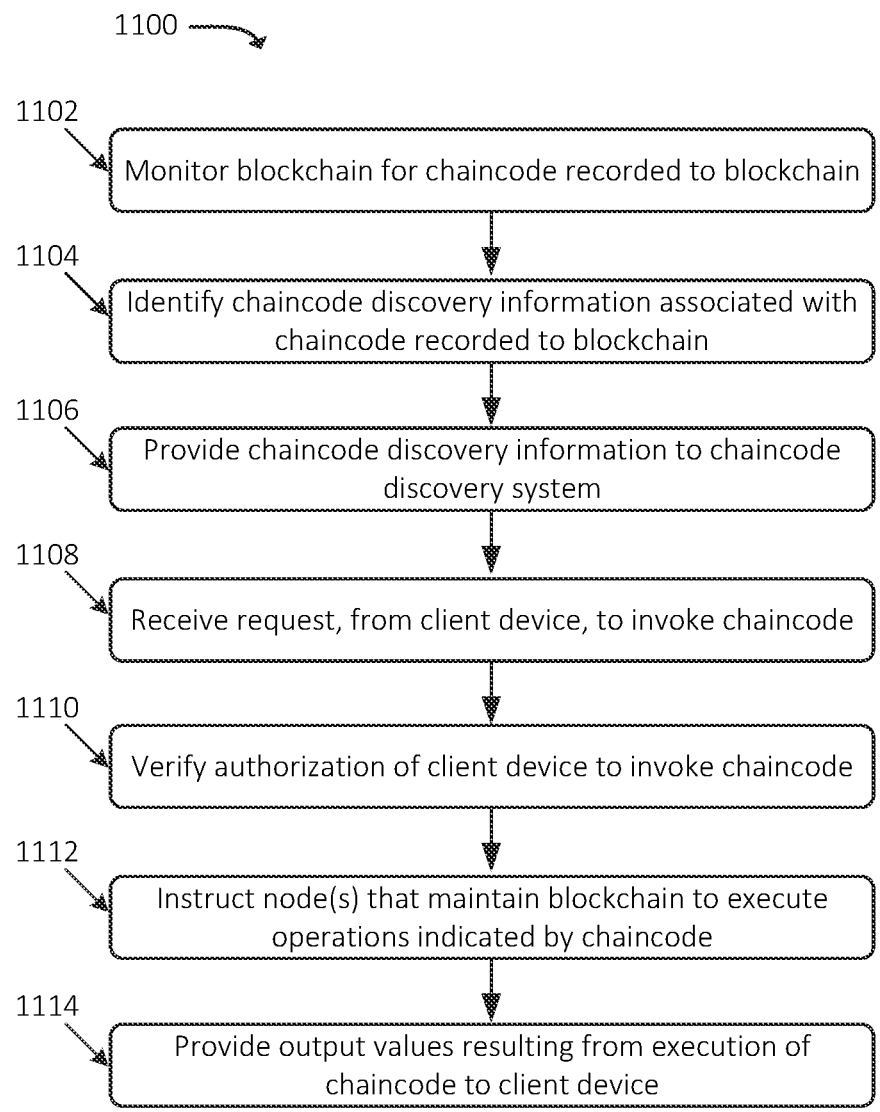
FIG. 11 illustrates an example process for facilitating a cross-chain discovery service, in accordance with some embodiments.

FIG. 11 illustrates an example process 1100 for facilitating a cross-chain discovery service. In some embodiments, some or all of process 1100 may be performed by CDS interface node 107 of a particular node group 105. In some embodiments, one or more other devices may perform some or all of process 1100. As discussed above, CDS interface node 107 may be implemented by a particular node 103 of node group 105 and/or may otherwise be communicatively coupled to one or more nodes 103 of node group 105.

As shown, process 1100 may include monitoring (at 1102) blockchain 101 to identify chaincode recorded to blockchain 101. For example, CDS interface node 107 may monitor blockchain 101 as records are added to blockchain 101, and may identify that a particular record includes chaincode. CDS interface node 107 may, for example, utilize pattern matching (e.g., identify records with particular flags or identifiers indicating that such records include chaincode that CDS interface node 107 should identify), artificial intelligence/machine learning ("AI/ML") techniques or other suitable modeling techniques, or other suitable mechanisms to detect that chaincode has been added to blockchain 101.

Process 1100 may further include identifying (at 1104) chaincode discovery information associated with the identified chaincode. For example, CDS interface node 107 may automatically identify input and/or output values, a name or identifier of the chaincode, a reference to the chaincode record (e.g., an address, hash, etc. of the chaincode record on blockchain 101), or other suitable information. In some embodiments, CDS interface node 107 may identify or receive access information associated with the chaincode record, such as a particular device, a particular group of devices, or other suitable criteria or policies indicating entities that are authorized to access and/or invoke the chaincode. In some embodiments, in addition to or in lieu of automatically identifying chaincode discovery information, CDS interface node 107 may receive chaincode discovery information, metadata, etc. associated with a particular chaincode record from one or more administrator devices or other suitable devices or systems. For example, such information may be received asynchronously or "out of band" with respect to the recordation of chaincode to blockchain 101. Further, in this manner, chaincode discovery information may be dynamically updated without requiring changes to the chaincode records on blockchain 101.

Process 1100 may additionally include providing (at 1106) the chaincode discovery information to CDS 109. As discussed above, the particular blockchain 101 may be only a single blockchain out of several blockchains for which CDS 109 receives chaincode discovery information (e.g., from CDS interface node 107 and/or multiple instances of CDS interface node 107 that are each respectively associated with different node groups 105 that maintain different blockchains 101). As discussed above, CDS 109 may make such information available, such that clients 203 that are authorized to access chaincode indicated in the chaincode discovery information are able to communicate with respective node groups 105 to invoke chaincode maintained on blockchains 101 associated with such node groups 105.

Process 1100 may also include receiving (at 1108) a request, from a particular client device (e.g., a particular client 203), to invoke the particular chaincode. As discussed above, client 203 may have communicated with CDS 109 to identify the particular node group 105, one or more nodes 103, and/or CDS interface node 107 with which the chaincode is associated. In some embodiments, the request may include identifying information of client 203, authentication information (e.g., one or more authentication tokens, keys, passwords, etc.), a reference to the chaincode (e.g., an address, hash, etc. of blockchain 101 on which the chaincode is recorded), one or more input parameters, and/or other suitable information.

Process 1100 may further include verifying (at 1110) that the client device is authorized to access and/or invoke the chaincode. For example, CDS interface node 107 may perform one or more authentication and/or authorization procedures, and/or may communicate with CDS 109 to obtain an indication of whether client 203 is authenticated and/or is authorized to access and/or invoke the requested chaincode. In instances where CDS interface node 107 determines that client 203 is not authenticated and/or is not authorized to access or invoke the requested chaincode, CDS interface node 107 may reject the request. For example, CDS interface node 107 may output a notification to client 203 that the chaincode was not invoked, and may forgo performing subsequent operations discussed below.

Process 1100 may additionally include instructing (at 1112) one or more nodes 103 of node group 105 to invoke the chaincode. For example, assuming that CDS interface node 107 has determined and/or has received an indication that client 203 is authorized to access and/or invoke the chaincode, CDS interface node 107 may instruct one or more nodes 103 of node group 105 to invoke the chaincode included in the chaincode record. CDS interface node 107 may further provide an identifier of client 203, inputs provided by client 203, etc. The nodes 103 of node group 105 may perform the operations specified in the chaincode, and may utilize the inputs provided by client 203 when performing the operations. As discussed above, the operations may include recording information to blockchain 101 that includes an indication that CDS interface node 107 and/or client 203 has invoked the chaincode, the inputs provided by client 203, one or more outputs generated based on performing the one or more operations, and/or other suitable information.

Process 1100 may also include providing (at 1114) output values resulting from execution of the chaincode to the client device. For example, CDS interface node 107 may provide the output values, a reference to one or more records created based on executing the chaincode, and/or other suitable information. As discussed above, in this manner, client 203 may be able to perform similar operations with respect to chaincode recorded across multiple diverse blockchains 101, thus providing a robust, flexible, and dynamic ecosystem for client 203 and other devices or systems.

Figure 12:
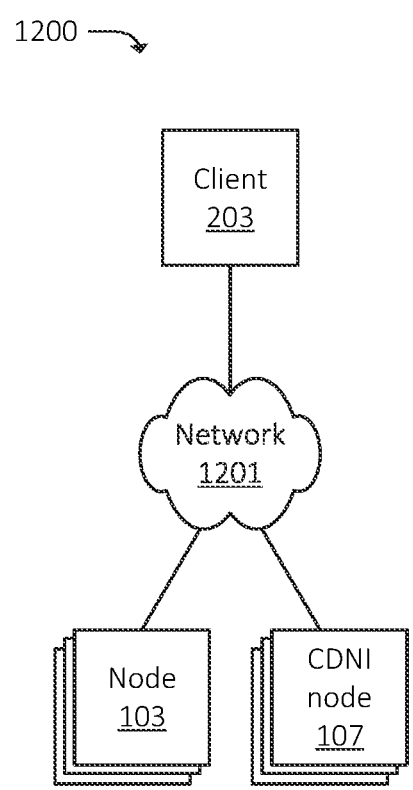
FIG. 12 illustrates an example environment in which one or more embodiments, described herein, may be implemented.

FIG. 12 illustrates an example environment 1200, in which one or more embodiments may be implemented. Environment 1200 may include network 1201, client 203, one or more sets of nodes 103, and/or one or more CDS interface nodes 107. In some embodiments, environment 1200 may include one or more additional devices or systems communicatively coupled to network 1201 and/or one or more other networks.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, while not shown, environment 1200 may include devices that facilitate or enable communication between various components shown in environment 1200, such as routers, modems, gateways, switches, hubs, etc. In some implementations, one or more devices of environment 1200 may be physically integrated in, and/or may be physically attached to, one or more other devices of environment 1200. Alternatively, or additionally, one or more of the devices of environment 1200 may perform one or more network functions described as being performed by another one or more of the devices of environment 1200. Elements of environment 1200 may interconnect with each other and/or other devices via wired connections, wireless connections, or a combination of wired and wireless connections. Some or all of the elements of environment 1200 may be implemented by one or more devices, sets of hardware resources, cloud systems, or the like.

Network 1201 may include one or more wired and/or wireless networks. For example, network 1201 may include an IP-based Packet Data Network ("PDN"), a wide area network ("WAN") such as the Internet, a private enterprise network, and/or one or more other networks. Client 203, nodes 103, CDS interface node 107, and/or other devices or systems may communicate, through network 1201, with each other and/or with other devices that are coupled to network 1201. Network 1201 may be connected to one or more other networks, such as a public switched telephone network ("PSTN"), a public land mobile network ("PLMN"), and/or another network. Network 1201 may be connected to one or more devices, such as content providers, applications, web servers, and/or other devices, with which client 203, nodes 103, CDS interface nodes 107, and/or other devices or systems may communicate.

Client 203, nodes 103, CDS interface nodes 107, and/or other devices or systems may be implemented by one or more cloud systems, server devices, or other types of hardware resources. In some embodiments, client 203, nodes 103, and/or CDS interface nodes 107 may be implemented by or communicatively coupled to a User Equipment ("UE"), which may include a computation and communication device, such as a wireless mobile communication device that is capable of communicating with network 1201. The UE may communicate with network 1201 via a wired or a wireless interface, such as via one or more radio access network ("RANs"), such as a Fifth Generation ("5G") RAN, a Long-Term Evolution ("LTE") RAN, etc. The UE may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device.

Figure 13:
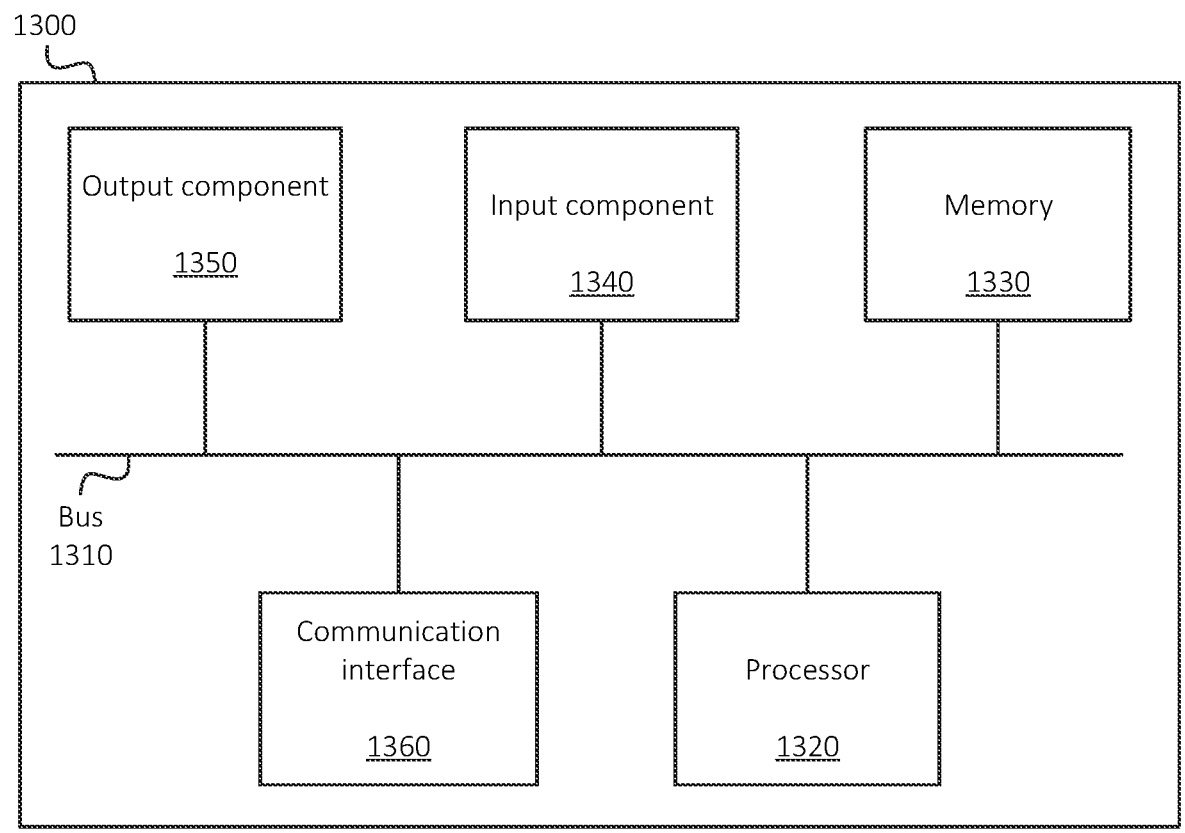
FIG. 13 illustrates example components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, a set of provisioned hardware resources of a cloud computing system, or other suitable type of hardware that interprets and/or executes instructions (e.g., processor-executable instructions). In some embodiments, processor 1320 may be or may include one or more hardware processors. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300 and/or other receives or detects input from a source external to input component 1340, such as a touchpad, a touchscreen, a keyboard, a keypad, a button, a switch, a microphone or other audio input component, etc. In some embodiments, input component 1340 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems (e.g., with one or more wired or wireless networks, one or more other devices, etc.). For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1300 may include more than one communication interface 1360. For instance, device 1300 may include an optical interface, a wireless interface, an Ethernet interface, and/or one or more other interfaces.

Device 1300 may perform certain operations relating to one or more processes described above. Device 1300 may perform these operations in response to processor 1320 executing instructions, such as software instructions, processor-executable instructions, etc. stored in a computer-readable medium, such as memory 1330. A computer-readable medium may be defined as a non-transitory memory device. A memory device may include space within a single physical memory device or spread across multiple physical memory devices. The instructions may be read into memory 1330 from another computer-readable medium or from another device. The instructions stored in memory 1330 may be processor-executable instructions that cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   identify a first chaincode record recorded to a particular blockchain that is maintained by a particular set of nodes, wherein the first chaincode record includes a first set of chaincode operations to perform;
   identify a second chaincode record recorded to the particular blockchain, wherein the second chaincode record includes a second set of chaincode operations to perform;
   identify first chaincode discovery information associated with the first chaincode record and second chaincode discovery information associated with the second record;
   output the first and second chaincode discovery information to a chaincode discovery system, wherein the chaincode discovery system maintains authorization policies indicating authorization of one or more client devices to request performance of respective sets of chaincode operations, wherein a client device receives the first chaincode discovery information from the chaincode discovery system and an indication that the client device is authorized to request performance of the first set of chaincode operations;
   receive a request from the client device to invoke the first set of operations included in the first record;
   request verification, from the chaincode discovery system, that the client device is authorized to invoke the first set of operations included in the chaincode record, wherein the chaincode discovery system verifies, based on the authorization policies maintained by the chaincode discovery system, that the client device is authorized to request performance of the first set of chaincode operations;
   receive verification, from the chaincode discovery system, that the client device is authorized to invoke the first set of operations included in the first chaincode record;
   instruct one or more nodes, of the particular set of nodes that maintain the particular blockchain, to perform the first set of operations;
   receive, from the one or more nodes, a set of output values resulting from performing the first set of operations; and
   output, to the client device, the set of output values resulting from performing the first set of operations.

2. The device of claim 1, wherein the first chaincode record includes particular information that is not included in the chaincode discovery information that is output to the chaincode discovery system.

3. The device of claim 1, wherein the particular blockchain is a first blockchain, wherein the particular set of nodes is a first set of nodes, and wherein the chaincode discovery information is first chaincode discovery information,
   wherein the chaincode discovery system further receives and maintains second chaincode discovery information that is based on a third chaincode record that is recorded to a second blockchain that is maintained by a second set of nodes.

4. The device of claim 3, wherein the client device further receives the second chaincode discovery information and requests that the second set of nodes perform a set of operations included in the third chaincode record after requesting that the first set of nodes perform the set of operations included in the first chaincode record.

5. The device of claim 1, wherein the request from the client device includes one or more device identifiers or device group identifiers, wherein requesting verification from the chaincode discovery system includes providing the one or more device identifiers or the device group identifiers to the chaincode discovery system.

6. The device of claim 1, wherein the chaincode discovery information includes metadata that is automatically generated based on the first chaincode record.

7. The device of claim 1, wherein the one or more processors are further configured to:
   monitor the particular blockchain for new records recorded to the particular blockchain, wherein the first chaincode record is identified based on the monitoring.

8. A non-transitory computer-readable medium, storing a plurality of processor-executable instructions to:
   identify a first chaincode record recorded to a particular blockchain that is maintained by a particular set of nodes, wherein the first chaincode record includes a first set of chaincode operations to perform;
   identify a second chaincode record recorded to the particular blockchain, wherein the second chaincode record includes a second set of chaincode operations to perform;
   identify first chaincode discovery information associated with the first chaincode record and second chaincode discovery information associated with the second record;
   output the first and second chaincode discovery information to a chaincode discovery system, wherein the chaincode discovery system maintains authorization policies indicating authorization of one or more client devices to request performance of respective sets of chaincode operations, wherein a client device receives the first chaincode discovery information from the chaincode discovery system and an indication that the client device is authorized to request performance of the first set of chaincode operations;
   receive a request from the client device to invoke the first set of operations included in the first record;
   request verification, from the chaincode discovery system, that the client device is authorized to invoke the first set of operations included in the chaincode record, wherein the chaincode discovery system verifies, based on the authorization policies maintained by the chaincode discovery system, that the client device is authorized to request performance of the first set of chaincode operations;
   receive verification, from the chaincode discovery system, that the client device is authorized to invoke the first set of operations included in the first chaincode record;
   instruct one or more nodes, of the particular set of nodes that maintain the particular blockchain, to perform the first set of operations;
   receive, from the one or more nodes, a set of output values resulting from performing the first set of operations; and
   output, to the client device, the set of output values resulting from performing the first set of operations.

9. The non-transitory computer-readable medium of claim 8, wherein the first chaincode record includes particular information that is not included in the chaincode discovery information that is output to the chaincode discovery system.

10. The non-transitory computer-readable medium of claim 8, wherein the particular blockchain is a first blockchain, wherein the particular set of nodes is a first set of nodes, and wherein the chaincode discovery information is first chaincode discovery information,
wherein the chaincode discovery system further receives and maintains second chaincode discovery information that is based on a third chaincode record that is recorded to a second blockchain that is maintained by a second set of nodes.

11. The non-transitory computer-readable medium of claim 10, wherein the client device further receives the second chaincode discovery information and requests that the second set of nodes perform a set of operations included in the third chaincode record after requesting that the first set of nodes perform the set of operations included in the first chaincode record.

12. The non-transitory computer-readable medium of claim 8, wherein the request from the client device includes one or more device identifiers or device group identifiers, wherein requesting verification from the chaincode discovery system includes providing the one or more device identifiers or the device group identifiers to the chaincode discovery system.

13. The non-transitory computer-readable medium of claim 8, wherein the chaincode discovery information includes metadata that is automatically generated based on the first chaincode record.

14. The non-transitory computer-readable medium of claim 8, wherein the plurality of processor-executable instructions further include processor-executable instructions to:
monitor the particular blockchain for new records recorded to the particular blockchain, wherein the first chaincode record is identified based on the monitoring.

15. A method, comprising:
identifying a first chaincode record recorded to a particular blockchain that is maintained by a particular set of nodes, wherein the first chaincode record includes a first set of chaincode operations to perform;
identifying a second chaincode record recorded to the particular blockchain, wherein the second chaincode record includes a second set of chaincode operations to perform;
identifying first chaincode discovery information associated with the first chaincode record and second chaincode discovery information associated with the second record;
outputting the first and second chaincode discovery information to a chaincode discovery system, wherein the chaincode discovery system maintains authorization policies indicating authorization of one or more client devices to request performance of respective sets of chaincode operations, wherein a client device receives the first chaincode discovery information from the chaincode discovery system and an indication that the client device is authorized to request performance of the first set of chaincode operations;
receiving a request from the client device to invoke the first set of operations included in the first record;
requesting verification, from the chaincode discovery system, that the client device is authorized to invoke the first set of operations included in the chaincode record, wherein the chaincode discovery system verifies, based on the authorization policies maintained by the chaincode discovery system, that the client device is authorized to request performance of the first set of chaincode operations;
receiving verification, from the chaincode discovery system, that the client device is authorized to invoke the first set of operations included in the first chaincode record;
instructing one or more nodes, of the particular set of nodes that maintain the particular blockchain, to perform the first set of operations;
receiving, from the one or more nodes, a set of output values resulting from performing the first set of operations; and
outputting, to the client device, the set of output values resulting from performing the first set of operations.

16. The method of claim 15, wherein the first chaincode record includes particular information that is not included in the chaincode discovery information that is output to the chaincode discovery system.

17. The method of claim 15, wherein the particular blockchain is a first blockchain, wherein the particular set of nodes is a first set of nodes, and wherein the chaincode discovery information is first chaincode discovery information,
wherein the chaincode discovery system further receives and maintains second chaincode discovery information that is based on a third chaincode record that is recorded to a second blockchain that is maintained by a second set of nodes,
wherein the client device further receives the second chaincode discovery information and requests that the second set of nodes perform a set of operations included in the third chaincode record after requesting that the first set of nodes perform the set of operations included in the first chaincode record.

18. The method of claim 15, wherein the request from the client device includes one or more device identifiers or device group identifiers, wherein requesting verification from the chaincode discovery system includes providing the one or more device identifiers or the device group identifiers to the chaincode discovery system.

19. The method of claim 15, wherein the chaincode discovery information includes metadata that is automatically generated based on the first chaincode record.

20. The method of claim 15, further comprising:
monitoring the particular blockchain for new records recorded to the particular blockchain, wherein the first chaincode record is identified based on the monitoring.

* * * * *